(12) United States Patent
Wolper et al.

(10) Patent No.: US 9,639,635 B2
(45) Date of Patent: May 2, 2017

(54) FOOTWEAR DIGITIZATION SYSTEM AND METHOD

(71) Applicant: Embodee Corp, San Juan, PR (US)

(72) Inventors: André E. Wolper, San Juan, PR (US); Isabelle Haulin, Portland, OR (US); George D. Borshukov, Portland, OR (US)

(*) Notice: Subject to any disclaimer, the term of this patent is extended or adjusted under 35 U.S.C. 154(b) by 14 days.

(21) Appl. No.: 14/758,870

(22) PCT Filed: Jan. 2, 2014

(86) PCT No.: PCT/US2014/010087
§ 371 (c)(1),
(2) Date: Jul. 1, 2015

(87) PCT Pub. No.: WO2014/107520
PCT Pub. Date: Jul. 10, 2014

(65) Prior Publication Data
US 2015/0339853 A1 Nov. 26, 2015

Related U.S. Application Data

(63) Continuation-in-part of application No. 13/733,093, filed on Jan. 2, 2013, now abandoned.

(51) Int. Cl.
*G06F 17/50* (2006.01)
*G06T 17/00* (2006.01)
*A41H 3/00* (2006.01)

(52) U.S. Cl.
CPC ............ *G06F 17/50* (2013.01); *A41H 3/007* (2013.01); *G06T 17/00* (2013.01); *G06F 2217/32* (2013.01); *G06T 2200/08* (2013.01); *G06T 2210/16* (2013.01)

(58) Field of Classification Search
CPC .......... G06Q 30/0601; G06Q 30/0641; G06Q 30/0643; A43B 3/0005
See application file for complete search history.

(56) References Cited

U.S. PATENT DOCUMENTS

| | | | |
|---|---|---|---|
| 6,968,075 B1* | 11/2005 | Chang | G06K 9/00214 382/111 |
| 2006/0171592 A1* | 8/2006 | Amico | G06K 9/481 382/203 |
| 2008/0232679 A1* | 9/2008 | Hahn | G06K 9/2036 382/154 |
| 2008/0304081 A1* | 12/2008 | Debevec | G01B 11/25 356/612 |
| 2009/0073162 A1* | 3/2009 | Waatti | A43D 3/02 345/419 |

(Continued)

*Primary Examiner* — Haixia Du
(74) *Attorney, Agent, or Firm* — Miller Nash Graham & Dunn LLP

(57) ABSTRACT

A footwear digitization system and method configured to determine physical attributes for any given footwear or other cut-and-stitched item, including dimensional and spatial properties, optical attributes, and assembly information, and utilizing those properties and attributes to generate a digital three-dimensional model thereof. The invention relates generally to the field of garment digitization, and the subsequent production of computer-generated images depicting the (digitized) garment at a level of quality comparable to studio photographs of the real garment article.

12 Claims, 3 Drawing Sheets

(56) References Cited

U.S. PATENT DOCUMENTS

2009/0202139 A1* 8/2009 Toyoda ............... G06K 9/6255
  382/145
2009/0222127 A1* 9/2009 Lind .................... A41H 3/007
  700/132

* cited by examiner

FOOTWEAR DIGITIZATION SYSTEM AND METHOD

FIELD OF THE INVENTION

The invention relates generally to the field of garment digitization, and the subsequent production of computer-generated images depicting the (digitized) garment at a level of quality comparable to studio photographs of the real garment article. More particularly, the invention relates to a process whereby physical samples of footwear, handbags and other cut-and-stitched goods, for example, can be digitized and shaped relative to a three-dimensional model within a computer in a manner that allows high-resolution and high-fidelity digitized images, or 'models,' to be generated cost-effectively and in volume. Such models can then be used in the marketing and sales of footwear, for example, in lieu of conventional studio photography. Further, the three-dimensional models can be used as digital assets for any computer application that requires visualization of footwear. Finally, the three-dimensional models can also be used to enable entirely new applications, including, but not limited to, the one described in U.S. patent application Ser. No. 12/454,947—GARMENT FIT PORTRAYAL SYSTEM AND METHOD.

BACKGROUND OF THE INVENTION

Apparel is universal, and drives one of the largest global industries and associated supply chains. Apparel imagery is evident everywhere, often in communications about apparel, but also in newer applications such as visual effects for video or film, or interactive entertainment such as video games, or in emerging applications such as the ONLINE TRY-ON[SM] service of garments via any web enabled device.

Apparel imagery is most often generated in a photo studio, where the article in question is shot under controlled lighting on a flat surface, or worn on a mannequin, or when worn by an actual human model. Usually multiple still shots or moving image sequences are taken, and then processed for use in print or on the web, or in design, or in movie productions.

Still images of a garment article for use on the web usually depict the garment from one or two points of view to help the viewer get an impression of the article. Sometimes more than two points of view are shown, but production costs for each point-of-view prevent more liberal use of multiple points of view. However, once a garment article has been digitized and processed into a three-dimensional model it is possible for a computer to generate a multitude of different points of view at a lower incremental cost per shot than studio photography, thus increasing efficiency—as long as the digitization and conversion of a real article of clothing into a three-dimensional model can be attained at a cost that is lower than studio photography (not possible prior to this invention), and provided that resultant image quality is photo-realistic, i.e. it is comparable in quality to more conventional studio photography.

Additional uses exist or are emerging for digital models of a garment. For example, computer graphics can use a digital garment model to generate any point-of-view (POV) image of the garment as worn—optionally without the wearer being visible ("hollow" portrayals). Other uses are the generation of point-of-view images for use in on-line garment customization applications, or to animate the garment as part of an entertainment or review experience.

Innovations in garment pattern digitization are summarized in U.S. Pat. No. 7,031,527 or in US Patent Application US2006/0171592. These and other related developments in the garment industry deal with the digitization of garment design & garment production data. Such systems aim to facilitate more cost effective design, development & manufacturing of garments from raw materials.

High quality digital models of footwear items exist, but highly trained computer graphics artists have to model them manually in a computer over many days with painstaking attention to detail in order to achieve high levels of realism. The limited availability of skilled computer graphics artists, and the time required to generate models with high levels of realism results in production costs of thousands of dollars, thus restricting the use of such models to large budget films or games.

Alternatively, some footwear items are designed using computer-assisted tools for pattern making, some of which enable apparel designers to model and render their patterns for three-dimensional viewing on a computer screen. Representative makers of such systems are Gerber Technology of Connecticut, USA; Lectra of France; and Optitex or Browzwear of Israel. However, these systems focus on textile manufacturing-oriented requirements, such as accurate pattern file generation, nesting of patterns on to fabric for yield maximization, and related functionality. These systems, while useful in the creation of footwear designs, typically lack the ability to create photo-realistic models of the footwear items, in part because some of the visual details inherent in a footwear item are only generated down-stream during manufacturing (similar to the 'wash' or other 'distressing' of materials in a garment, for example), and in part because the creation of photo-realistic digital models using computer-assisted tools requires the aforementioned three-dimensional modeling and rendering effort, which is very labor intensive and also requires skills not typically found in the textile and garment design industry.

SUMMARY OF THE INVENTION

What is described herein is a footwear digitization system and method than can support the cost-effective generation of digital footwear models with enough inherent data to enable the generation of photorealistic images from said models using advanced computer graphics. This in turn enables an alternative means to conventional photography as well as enable a range of new uses as described within. The invention described herein, in its several contemplated embodiments, enables the reverse of prior art methods and systems—namely, utilizing existing footwear items from the real world and creating cost-effective, faithful digital reproductions thereof.

A system and method for the digitization of a specific sample cut-and-stitched good into a high-quality, cost-effective digital model is disclosed. The digitization method employs digital capture via photography or scanning, data processing and automation to generate a digital model of the footwear or other cut-and-stitched item that is dimensionally faithful to the original article, and includes the visual detail that is apparent in the original article. Additionally, the digital footwear model includes optical properties, such as its reflectance including color, which allow the model to properly respond to simulated lighting, thus further increasing the realism and utility of the model.

The disclosed method extracts the optical and shape data from the sample footwear item and transforms the extracted data into a digital model with faithful detail and fidelity while minimizing the use of manual (human-assisted) computer graphics modeling to reduce production costs by an order of magnitude. This last point is key in order to enable footwear digitization at a greater scale, without impediments such as the limited availability of highly skilled computer graphics artists or other high labor cost components.

DETAILED DESCRIPTION OF THE PREFERRED EMBODIMENTS

Figure 1:
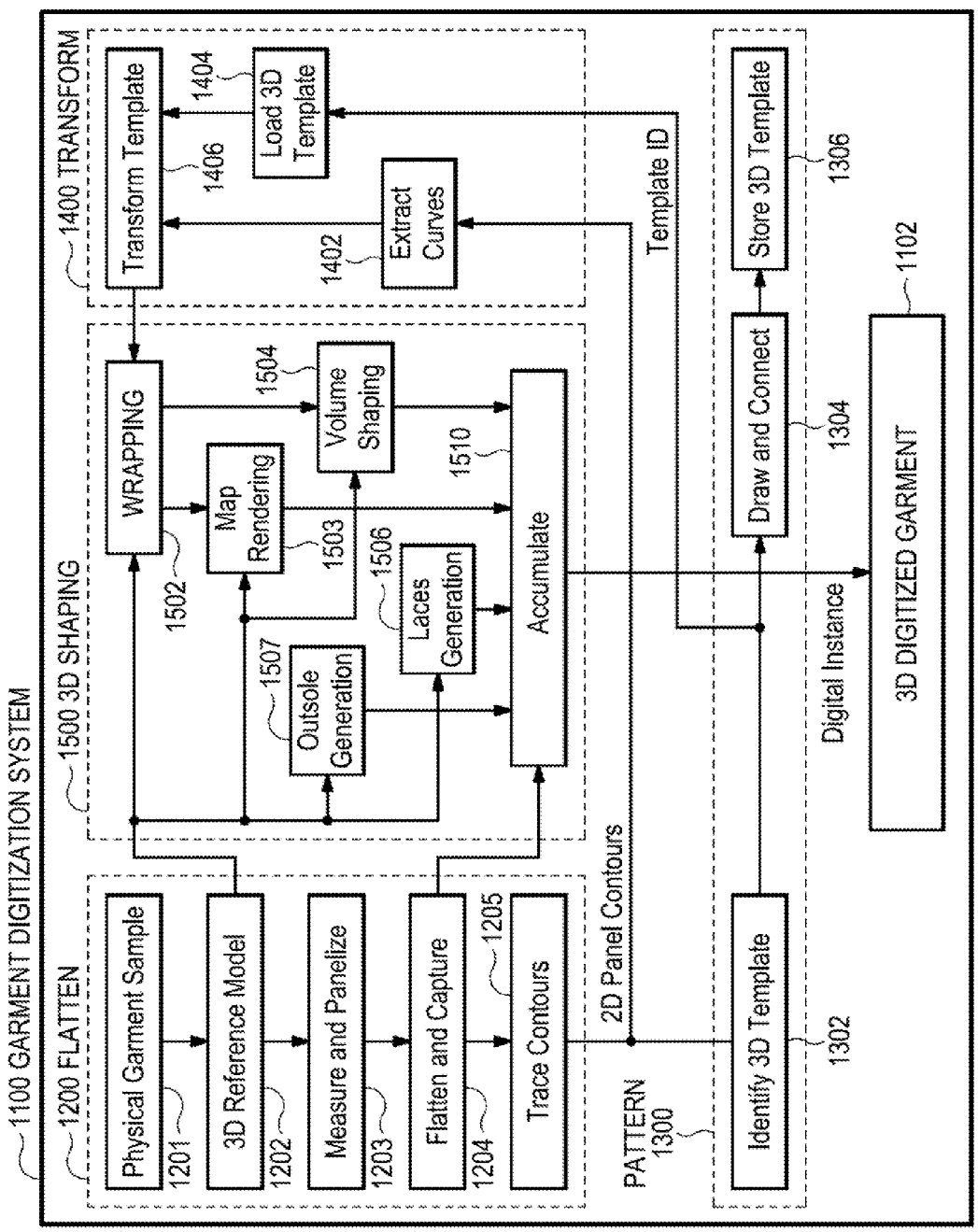
FIG. 1 is a process flow and functional block diagram showing the steps by which a physical footwear sample is converted into a digital model, according to an embodiment of the invention.

The present invention expands upon the scope and disclosure of application Ser. No. 12/798,879, utilizing many of the same features and operations, while also introducing new features and operations. In particular, while footwear is generally considered within the relevant industry to be a type of garment, and some forms of footwear (e.g., socks, soft slippers, etc.) can be fully processed by the system and method described in application Ser. No. 12/798,879, other common types of footwear present unique challenges for digitization. The inventive embodiments described herein solve many of those challenges, and provide a useful tool for beneficially digitizing a far broader range of "cut-and-stitched goods," which as used in this application and its claims, means goods constructed from a pliable-material, including but not limited to textiles or other non-woven materials, whether synthetic or natural, which is cut into shape and then stitched or otherwise joined together, during manufacture. In particular, embodiments of the digitization method described in this application are specifically architected to enable the cost-effective generation of high-resolution, high-fidelity digital product imagery for a wide variety of uses.

As defined herein, cut-and-stitched goods may optionally include one or more relatively inflexible portions (e.g., molded or otherwise preformed, semi-rigid or rigid parts that generally will not lay flat in a relaxed state devoid of stretch or compression, for example, a footwear item featuring a molded polymer or rigid outsole, or a handbag featuring a rigid handle, etc.), referred to in this application collectively and solely for descriptive convenience as being "rigid."

Solely for convenience throughout, the embodiments are described using footwear—in particular, shoes—as an exemplary type of cut-and-stitched goods or products, but such references are intended to represent and likewise encompass other cut-and-stitched goods sharing similar construction and materials, such as handbags/purses, backpacks, hats, upholstery, etc.

Further, solely for descriptive convenience throughout this description, the term "outsole" is used according to an exemplary embodiment, and is intended to likewise represent other 'rigid' features, or "unflattened portions," such as fasteners, handles, etc., optionally present in cut-and-stitched goods such as handbags/purses, backpacks, hats, upholstery, etc., according to alternative embodiments. Therefore, the use of the term 'outsole' in this description is not intended to limit, and should not be interpreted as limiting, the scope of the invented embodiments to only footwear. Likewise, although the term "last" typically refers to a generic model in the approximate shape of a foot, used in the manufacturing and repair of shoes, similar devices are also used in the manufacture and repair of hats (e.g., a hat block) and other cut-and-stitched goods. Therefore, the term "last" as used in this description and the accompanying claims is intended to include any and all such devices and structures.

Referring to FIG. 1, a digitized footwear model is generated through typically four Stages, named as follows:

1. "1200—FLATTEN", which receives a footwear item sample in a specific size and outputs it in a two-dimensional digital form consisting of flat panels, including optical and contour information for each. A panel is defined as a section of the footwear (or other cut-and-stitched) item's surface material, along with information on how it was or is to be connected to the other panels of a given footwear item. Taken together with the outsole, laces, and other optional features, all panels of a given footwear item constitute the entire surface of said item. The panels are output as traced contours to subsequent stages, together with optical attributes representing their appearance.

2. "1300—PATTERN", which exists to generate a three-dimensional template for a given footwear item sample provided that it has not been previously established, based on input from block 1200. The three-dimensional template is a generalized version of a footwear style that aids in the rapid production of a three-dimensional digitized footwear item, and is stored for subsequent retrieval via a unique template ID by block 1400.

3. "1400—TRANSFORM", which also takes the flat output of block 1200 and combines it with a matching three-dimensional template to get it back to the three-dimensional form it is intended to be. The three-dimensional template file is transformed into a three-dimensional footwear file that accurately represents the footwear item sample in question, ready for wrapping onto a reference model, and outputting to block 1500.

4. "1500—3D SHAPING", which takes specific flat surface panels from block 1400 and wraps them around the reference surface obtained from block 1202, avoiding the introduction of undesirable stretch on the wrapped surface. The panels located inside the footwear are usually not present in the reference model, so the missing parts need to be extrapolated. Geometry for Footwear Laces, if any in the footwear sample, will be created using a procedural method that reduces any manual labor required to complete the 3D Digitized footwear item. The Footwear's outsole, if present and rigid, is generated using traditional modeling techniques if it cannot be otherwise flattened. Next, using a technique called depth map rendering, a 2D image is generated representing the Footwear sample's fine geometry. The resultant 3D model is combined with the optical information and is outputted as a complete digital instance of the specific footwear sample. This output can be used by another system or application for point-of-view dependent computer renderings thereof under simulated lighting, i.e. for uses such as those described in the background of this invention.

FLATTEN Stage 1200:

The process begins with a physical footwear sample at block 1201. Said sample is a complete footwear item with all construction details such as stitches, buttons, eyelets, or other design elements as are appropriate for the particular footwear item.

Before processing of the footwear sample begins, a reference model of the shoe is obtained via block 1202. The purpose of the three-dimensional (3D) Reference Model is to guide the overall digitization toward an eventual target shape, after which it is discarded. In its simplest form, it will look like a foot-shaped object that is used in footwear design or manufacturing to shape the product. The 3D Reference model can either be obtained by (a) using a pre-existing 3D model of a last; (b) scanning a last matching the footwear sample via a conventional 3D scanner, (c) by using a pre-existing 3D computer aided drafting (CAD) model of the footwear sample, or (d) by scanning the footwear sample via a conventional 3D scanner capable of capturing very small details of the footwear item's surface, prepared and styled in such a manner that the footwear item's surface is in its relaxed state, i.e. devoid of tension or compression within the material. This is important in order to get accurate dimensional information from the 3D scan, including a dense polygonal object representing fine details such as stitched threads, eyelets, and laces, but does not need to capture color information. If the 3D Reference model is either a pre-existing 3D CAD model of the footwear sample or the result of a 3D scan of the footwear sample (instead of a last), it can be used to help reconstruct the low-level geometry details in block 1503. Either way, the 3D Reference Model is passed as an output to subsequent stages within block 1500, particularly the WRAPPING operation depicted at 1502.

Next, the block at 1204 takes a footwear sample and analyzes it for the purpose of panelizing it. An operator experienced in this step will be aware of similarly panelized items that may have been produced at a previous time. A footwear sample is panelized with a physical cutting tool such that it matches a previous panelized footwear sample to the greatest extent possible. For instance, if a shoe has previously been panelized into four panels, a new shoe will also be cut into four panels if possible, with the same number of seam lines at the same or similar locations. The criteria to be applied in this decision-making are further described in the following paragraphs.

Panelization occurs by creating constituent panels via a footwear cutting mechanism, either a hand-tool such as scissors, a knife, or a programmable cutting mechanism, such as a laser system or equivalent. Panels can be obtained by cutting along seams; however not all seams must necessarily be cut, and it is sometimes practical to cut along lines that are not seams. The resultant panels can be sub-assemblies of multiple sewn pattern pieces as long as a given panel is able to lay flat with all of its material in a relaxed state devoid of stretch or compression. This is necessary because subsequent processing at blocks 1304 and 1402 requires shape information from these panels with their fabric presumed relaxed in order to generate accurate dimensional information, which is critical to the generation of the resultant 3D digitized footwear item, especially if it is to be highly representative of the actual footwear sample.

Once the panels have been obtained, the next step is 1206, Flatten & Capture. The panels, as well as the footwear sample's laces (if any), are mounted on a flat background of contrasting color, with each item also flat and free of wrinkles if possible. Some panels may be photographed twice, once per side, if both sides will be visible in the final 3D model, for example the footwear tongue. The capture process avoids the presence of light fall-off or shadows within the panels by casting spatially non-varying illumination upon the panels. In one embodiment of the system, the illuminated flat panels are photographed with standard studio digital camera equipment. The reflected light is also recorded with a light capture mechanism and processed into two or three components, a "color bitmap", a "reflectance map", and, optionally, a "micro-detail map", as defined below (for this purpose, the use of a commonly available, operable-configurable reflectometer, or spectrophotometer, shall be referred to hereafter as a light capture mechanism).

Color Bitmap:

This is a two-dimensional record of color values for each point of the panels subject to the resolution of the image. The Color Bitmap enables reproduction of color driven visual detail in the footwear item's surface, such as stitching, color variation such as intentional fading, graphics, and other details. The Color Bitmap will be used as a color texture map in subsequent computer renderings of the final three-dimensional model. Using light polarization filters (on the lights and camera lens) the system can optionally acquire two separate images—one of the diffusely reflected light (where polarization is lost) and one of the specularly reflected light (where polarization is preserved). When only a single color image is acquired (no polarization filters deployed) the diffuse reflectance (albedo) map is approximated as a saturated version of the single Color Bitmap and the specular reflectance map as grayscale version of the single Color Bitmap. In addition, edge detection algorithms will use the Color Bitmap in block 1402 to extract each panel's outline curves.

Reflectance Map:

this is a multi-dimensional function map—one that determines the amount of light that is reflected for each point (pixel) of the panel, at multiple angles of entry and exit. It requires separate equipment in order to attain most precise bi-directional surface reflectance, which can be captured optionally. By default, reflectance data can be assigned to each panel from a nearest match of a bi-directional data measurement retrieved from a database of previously acquired samples, or the values from an analytical model such as Lambert, Blinn or Cook-Torrance can be assigned. However, if more sophisticated reflectance recording equipment is available, then more detailed bi-directional surface reflectance measurement can be performed per specific panel, and used instead of the default values, enabling a higher level of computer rendering quality for subsequent users of the digitized model.

Micro-Detail Map:

To further increase the fidelity of surface detail, the end of block 1204 can take optionally capture depth information of the micro-details on the surface of the panels. By "flat model" we describe an object such as the aforementioned flattened footwear sample—it is flat overall, such that it could lie flat on a table, for instance. Further, we mean flat at a macro level, yet, at a smaller scale the object is likely not perfectly flat, as the surface of the flat object is likely to have micro-details such as small perforations, texture detail, or perhaps featuring edges of various material layers used to construct the footwear sample. This surface variation can be obtained using a suitable flatbed scanner capable of capturing surface details in 3D as described in the following paragraph.

The mounted panels are scanned using structured light or via three-dimensional camera technology or another shape acquisition technique to obtain additional bump/normal and depth/displacement maps (for example, surface normals or depth information) as a third component of the optical information that is being gathered. We define such Micro-detail as spatial information further enhancing the surface definition, and thus, affecting the visual reproduction of footwear material in a computer rendering thereof. Such spatial information can enhance the reproduction of the appearance of the footwear material in a computer rendering, if rendering technology with the ability to consider the Micro-detail Map is used. Such rendering technology considers the micro-detail in its calculation of the surface shading variation being caused by said micro-detail, and can, for example, produce the minute shadows that would be present in the weave of a fabric.

The Color Bitmap, the Reflectance Map with its bi-directional reflectance data (or the parameters of an appropriate analytical model), and the (optional) Micro-detail Map are passed on as the footwear item's optical attributes describing the panel surfaces to block 1500 3D SHAPING where they are accumulated as part of the digitized footwear. This set of optical attributes constitutes the information controlling point-of-view dependent appearance under simulated lighting in subsequent computer renderings of the digital model.

Next, contours are traced at block 1205: The two-dimensional Color Bitmap generated by the Capture at block 1204 can now be processed on a computer, using image-processing algorithms to generate a two-dimensional contour map of each panel. The resultant output is essentially a tracing of the perimeter of each panel as it was cut (physically or digitally), to scale, i.e. dimensionally faithful to the actual article, and completes the function of the capture apparatus (a computer program implementing such perimeter tracing is hereafter referred to as a contour outline mechanism). The resultant two-dimensional panel contours can be used to generate a three-dimensional template for this type of footwear style via block 1300 if a matching template does not yet exist; and also serves as the piece of information that enables block 1400 to generate a dimensionally faithful digital instance of the particular footwear being processed.

PATTERN Stage 1300:

The first step of this stage is to determine if the incoming two-dimensional panel contours have a match in a three-dimensional template that has been previously constructed. If so, the ID of a three-dimensional template with matching panels is determined and passed on the following stage. If not, a new template ID is defined, which will be passed on to the next stage, and additionally block 1300 proceeds to generate a three-dimensional template generation job. Such a job will be assigned to a human operator with sufficient skills (and equipped, for example, with a commonly available, operable-configurable, three-dimensional modeling software tool) to draw or generate a three-dimensional template—likely as a variant of a template that has been previously generated—and once such a matching three-dimensional template has been generated it is stored for future retrieval via its template ID.

Figure 2:
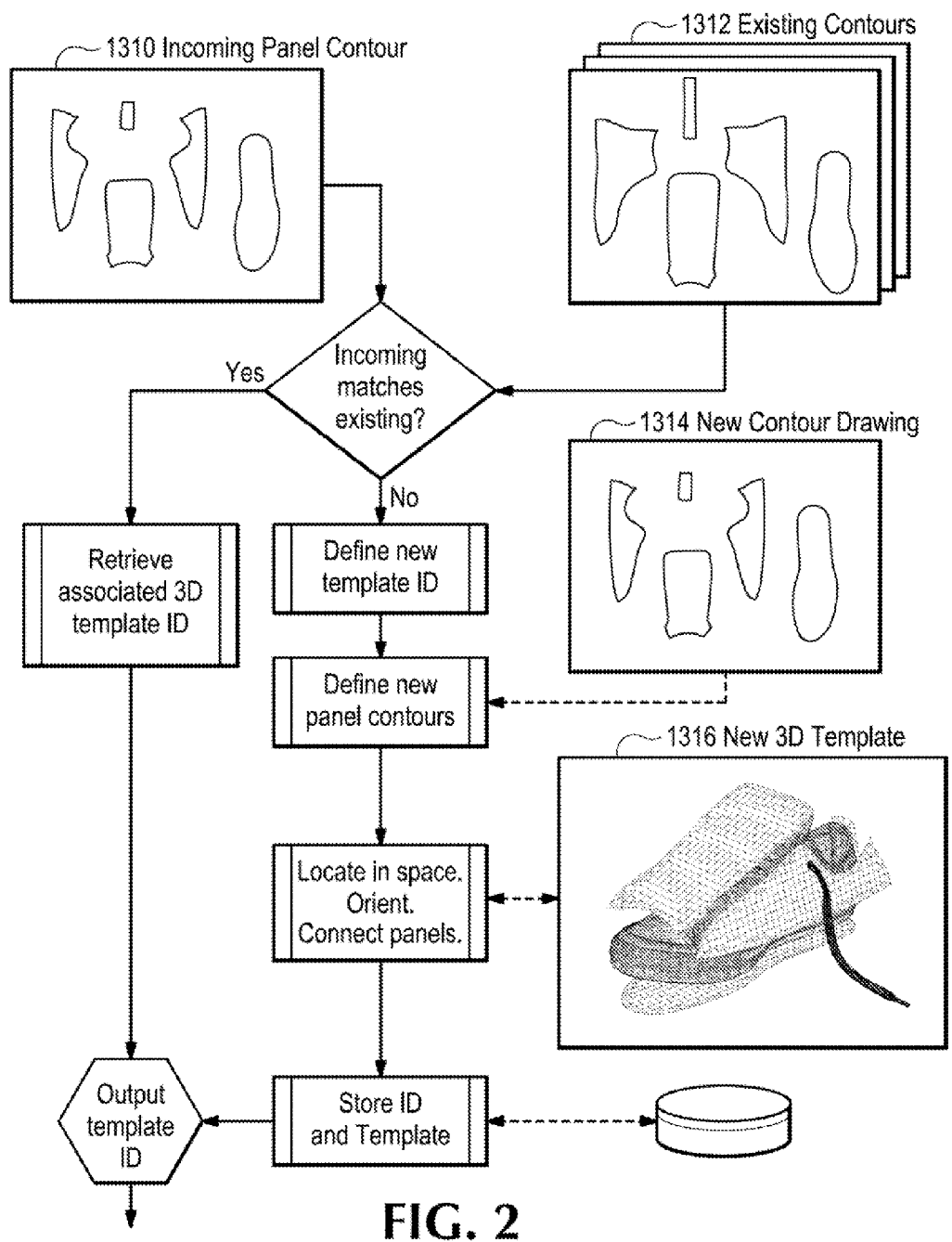
FIG. 2 is a process flow and functional block diagram showing the steps by which a re-usable three-dimensional template of a footwear model is generated, according to an embodiment of the invention.

Referring to FIG. 2, the following provides more detail on the key operations and tools that comprise block 1300, and which are used to generate a three-dimensional template.

A three-dimensional template is a generalized, digital representation of a given footwear style, not necessarily representative of a specific footwear item's dimensions. The three-dimensional template consists of a number of panels and the connections between them.

The system preferably builds on the existence of a three-dimensional template pattern library that has to be built once in order to achieve economies of scale for the production of digitized cut-and-stitched items over time. When a new footwear sample is processed, the closest existing template pattern is retrieved from the template library either through manual (human operator) selection or through the use of a computer assisted search.

A new three-dimensional template starts by having its panels drawn as a two-dimensional shape with a contour defining its perimeter. The perimeter is defined through a series of points, which give the panel its shape. An example of this is shown in FIG. 2 at 1314. Next a set of panels, with all their points defined, is assembled into a three-dimensional template.

The template is preferably built using a commonly available three-dimensional authoring tool such as Autodesk Maya, Autodesk XSI (or other suitable alternative; such a software tool, operated as described herein, shall be referred to hereafter as a three-dimensional template generation and storage mechanism). Using such a tool, each panel is placed in three-dimensional space. Next, a subset of each panel's points are designated connection points, i.e. they are linked together into corresponding pairs defining how the various panels shall be digitally connected together. An example of this is shown in FIG. 2 at 1316.

Each panel in the three-dimensional template has default parameters assigned, namely the panel's default dimensions. A three-dimensional template's default panel dimensions and default mechanical properties can (but need not) correspond to a specific footwear sample until the template is transformed and wrapped to represent a specific instance of a footwear sample. In summary, a three-dimensional template consists of the following information:

1. A number of panels that have been drawn and are expected to correspond to a typical footwear style that will be panelized for the purposes of digitization. These panels exist as points defining their perimeter, and also define how the panels can be connected together to form a footwear top. The specific dimensions of each panel have default values, which can be adjusted in subsequent uses of the template to match those of specific footwear when the template is used for actual digitization of specific footwear.
2. Connection information between these panels.

Taken together, the three-dimensional template data govern the process that will tessellate the panels, and connect them back together again during the WRAPPING stage.

Given a sufficiently large template library, an identical template pattern will typically be found. If not, a three-dimensional software tool operator, creating a new variant, may perform some adjustments on an existing template pattern. For example, some panels may be removed, some panels may be added, some panels may be cut into two distinct panels to be stitched together, or some panel shapes may be adjusted. This process requires an ordinarily skilled three-dimensional software tool operator, however, the need for such intervention will decrease over time as the template library grows. Thus the operation of this system will decrease in cost over time because the majority of the footwear industry uses styles with patterns that are used repeatedly, with relatively minor variations in panel dimensions, fabric and detailing.

TRANSFORM Stage 1400:

Beginning with block 1402, the incoming two-dimensional panel contours from an actual footwear sample being processed are used and converted through a feature point extraction and curve-fitting algorithm to vector based curves (for example Bezier curves) that represent the outlines of each panel. These extracted curves provide accurate dimensional information of the footwear in its flat, relaxed (i.e. not stretched or compressed) state. An existing three-dimensional template in a subsequent step will use the extracted curves.

Next, block 1404 loads a previously constructed three-dimensional template from the template store using the unique template ID that was passed into the TRANSFORM stage. This three-dimensional template has the same number of panels, and the same connective relationship among them as the two-dimensional panel outlines that were created during panelization in block 1200. There does not need to be a match of the precise dimensions between the contours of the template's panels and the panel contours produced by block 1200; however there does need to be a match in terms of the number of panels, their general shape, and the original (pre-panelized) connections among them.

Block 1406 will proceed to transform the existing three-dimensional template's panel size and shape to exactly match those of curves extracted from 1402. In this way, a general three-dimensional footwear template can assume the precise dimensions and size of a specific footwear sample, which has been flattened into a matching number of panels by the functions in block 1200. The template transformation results in a new instance of the referenced three-dimensional template pattern that has now assumed the exact dimensions of the footwear sample being processed. This transformation step is automatable and performs two tasks: for each panel, identify the matching extracted curve, match that curve's shape, and match key points on the curve, such as the points needing to be stitched (or zippered or buttoned) together. The output of this last step in block 1400 is an instance of a three-dimensional template that is ready for use in block 1500.

The advantage of this method is that once a particular three-dimensional template is created and stored in block 1300, said template can be repeatedly reused as long as a given (new) footwear sample, once flattened, finds a match in the three-dimensional template store. This is a key enabler of lower digital footwear production costs, because the three-dimensional template work that is performed is reused and needs to be performed only once for a particular footwear type or style (at blocks 1402, 1404, and 1406, when completed with a commonly available, operable-configurable, three-dimensional modeling software tool shall be referred to hereafter as a template transformation mechanism).

3D SHAPING Stage 1500:

The final step in the creation of a digitized footwear sample is to create a 3D surface of the footwear sample. This 3D surface result is expressed as a three-dimensional geometry computer file, in a commonly available format (for example as a polygonal mesh expressed in industry standard .OBJ, .X3D, or similar file format) that is compatible with commonly available three-dimensional modeling software such as Autodesk Maya, Autodesk XSI, or similar tools.

Block 1502, WRAPPING, commences with the footwear specific instance of a three-dimensional template, and, by a process called tessellation, converts the panels' two-dimensional (2D) contour curve into a flat surface constructed as a (initially flat) mesh of polygons. The texture mapping information generation is straightforward at this point, as the texture coordinates (UVs) are equal to the 3D point coordinates of the mesh polygon's vertices, given that the object is flat and has not yet been shaped via wrapping. Next, those flat panels are wrapped onto the reference model from block 1202. This process requires an operator to specify the correspondence between the location of a set of points on the flat panel and the target object. Those points are referred to as markers. Most of the markers are carefully chosen along the panel contour line. A few additional ones are defined inside the panel. Once markers have been defined, the wrapping algorithm moves the mesh vertices matching the markers to the markers' target location. Next, the algorithm uses scattered data interpolation to compute the position of other vertices. Therefore, it maintains the original mesh shape as much as possible, and does not introduce unnecessary stretch or shrinking along the surface. This algorithm is described in further details in the following publication: Synthesizing Realistic Facial Expression from Photographs, by Frederic Pighin, Jamie Hecker, Dani Lischinski, David H. Salesin, and Richard Szeliski, July 1998. From there, an iterative process further matches the panel's shape with the target reference model's shape. This process alternates a projection step (each point is moved to its closest location on the reference model) and a relaxation step (points are moved in plane to reduce edges stretch/shrinking compared to the original flat mesh), while constraining the markers' positions, until all edges stretch/shrinking is lower than a user defined maximum value, or a maximum number of iterations is reach. The fully wrapped version of the footwear is again expressed in a common three-dimensional geometry file (block 1502, when completed with a commonly available, operable-configurable, three-dimensional modeling software tool, shall be referred to hereafter as a "wrapping mechanism").

When a flattened version of the reference model from block 1202 is available, another simpler method is used to execute the wrapping. By "flattened model," we mean a surface that has the same topology as the reference model, but has a flat shape, and the amount of edge stretch between the flattened model and the 3D model is lower than a maximum value, and uniformly spread. In this case the wrapping algorithm is as follows: for each vertex of a given flat panel of the footwear, the closest location on the flattened reference model is computed in 2D parameter space coordinates commonly referred to as (s,t), then the same (s,t) location is found on the 3D reference model, and the panel's vertex is moved there.

Block 1503 takes as an input the highly detailed reference 3D model from step 1202 (if present), and computes the difference between the wrapped panels and this reference model. As a result, an optional depth map is rendered, that can be used as a displacement map, or a bump map, enabling improved rendering of the resultant 3D Digitized cut-and-stitched good (or more particularly, footwear item). In some cases, using a subdivided version of the wrapped panels to generate the depth map may give better results.

Block 1504 takes as input the new 3D footwear model resulting from the wrapping mechanism, block 1502. At this point, the emerging digitized model can be called a "shell" in the sense that it is a thin surface without any thickness. Block 1504 gives the shell volume, by turning each panel into two connected surfaces, the inside surface and the outside surface. In the case of the 3D reference model being based on a last, the shell matches the footwear's inside surface at this point. Block 1504 will generate the outside surface, by duplicating the existing shell panels, and pushing (displacing) them out by an amount corresponding to the thickness of the material of the shoe sample. In the case of the 3D reference model being based on a 3D CAD model or a 3D scan of the footwear sample, the shell provided by block 1502 matches the outside surface of the footwear sample. In this case, block 1504 will generate the inside surface by duplicating the existing shell panels, and pushing them inside by an amount corresponding to the thickness of the material of the shoe sample.

Block 1506 generates geometry for the laces, a procedural method to reduce the amount of manual modeling effort. An operator draws a 3D path matching the path of the laces through the eyelets of the shoe sample. In addition, a straight lace is modeled in 3D by an operator or retrieved from an existing lace 3D models library. If the 3D reference model is based on a 3D CAD model or a 3D scan of the footwear sample, it is used as a reference to draw the path. Otherwise, the operator will draw the path manually. The texture mapping information generation for the straight lace is straightforward given that the laces are still flat. The lace's ultimate geometry subsequently results from programmatically curving the straight lace geometry along the path. Optionally, eyelets geometry may also be generated here, using a simple torus type primitive.

Block 1507 generates geometry for the outsole. As this part of the footwear sample usually cannot be flattened, alternate traditional modeling methods may be used here, such as a process commonly called resurfacing or retopologizing. Resurfacing means that an operator creates a new 3D model that matches the shape of the reference model, but with a new topology. This topology is carefully designed so that it is controllable, and can be flattened for the purpose of texture mapping. As far as texture image, parts of the outsole such as the bottom surface can usually be photographed as part as block 1204. For other parts of the outsole such as the sides, a digital artist may paint the texture image either from piecewise photographs of the shoe sample, or from the depth map captured in block 1204 or 1503. However, when the reference model has a high level of detail, and a texture map image of good quality, the outsole part can be extracted from the reference model and used as is. Alternatively, when a 3D scan of a last is used as a source of a 3D reference model for wrap targeting purposes, the outsole is manually modeled in block 1507, and provided to the merge process in block 1510.

Block 1510 puts all 3D model components together, specifically footwear top, footwear inside, outsole and laces, and merges them into a single 3D model. If a 3D reference model with a high level of detail derived from the actual cut-and-stitched good is used, the 3D model components are already aligned with each other, because their creation process wrapped to the same reference model, and rigid parts, if any, can be used directly from the reference model. Alternatively, if some parts (such as an outsole for example) come from a different source object (e.g., a CAD model, etc.), and don't match the reference model, then the merge is completed by an operator of the three-dimensional modeling software, manually adjusting scale, orientation and position of one or more of the parts in 3D space until they do match the reference model. Once all parts have the same scaling and orientation, they are grouped together at block 1510 accumulating all data and creating one instance (a collection of one or more files) of the digital footwear, and then are passed on to block 1102 for storage of the final result. Contained in this instance of the digital footwear item are one or more of the following pieces of information:

1. Shape information: three-dimensional geometry file; this file contains the 3D surface definition, optional normals (used in computer graphics to determine a surface's orientation), and texture coordinates.
2. Optical information: a Color Bitmap, a Reflectance Map with bi-directional reflectance data, and, optionally, a Micro-detail Map usable as bump/normal or depth/displacement map;

A computer program implementing block 1510 and storing all of the accumulated data in one or more files shall be referred to hereafter as a collection mechanism.

The final result is a three-dimensional digitized footwear (or another cut-and-stitched item, according to an alternative application of an embodiment) that is a dimensionally faithful reproduction of a real-world physical footwear sample, and which contains all data needed by any application seeking to render footwear derived from real world footwear samples, with enough accuracy to support applications requiring precise size correspondence (between a real-world footwear item and a corresponding digital instance thereof), and a full complement of optical attributes sufficient to generate full realism of footwear depiction via a high quality rendering.

Figure 3:
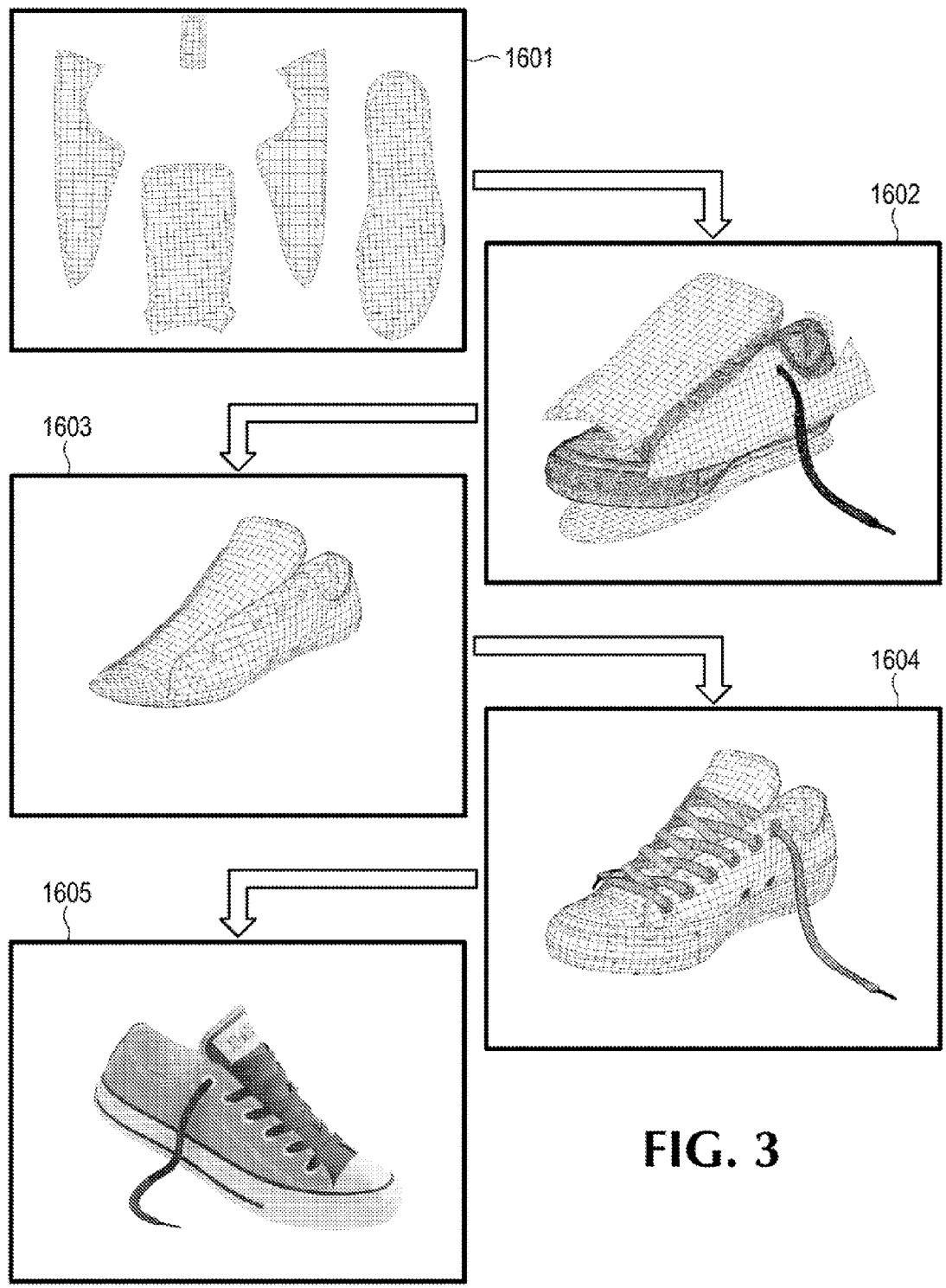
FIG. 3 shows a footwear sample being processed at different stages of the digitization process, according to an embodiment of the invention. Also included is a 'screen-grab' image (1605) of an exemplary result of advanced computer graphics, providing an illustrative example of how a finished 3D digitized footwear item would look, according to an embodiment of the invention.

In summary, the invention described here enables the efficient production of visually faithful digital instances, or replicas, of real-world footwear. FIG. 3 at 1605 shows a representative example of the result once a digital footwear instance has been produced and rendered by a system capable of advanced computer graphics rendering (not described herein). In one embodiment of this invention, images 1601 through 1604 show the digitized model at different stages of the digitization process, using a 3D CAD model or a 3D scan as the 3D reference model. 1601, 1602 and 1603 are intermediate states within step 1502. 1601 shows the tessellated panels, still in their flat state. 1602 shows the same panels, beside the reference model (a full scan model here as described in 1202). At 1603, the flat panels have been wrapped onto the reference model, and this is representative of block 1502's output. 1604 is the result of block 1510, where the shell has been turned into a volume, and laces, eyelets and outsole geometry have been added. Once the footwear digitization data are fully processed at block 1400 and 1500, and subsequently rendered by a system capable of advanced computer graphics rendering (not described herein), the image at 1605 may be seen to represent the visual realism and detail inherent in a three-dimensional digitized footwear item produced by the method described herein. As can be seen by this example, it possesses a level of visual fidelity comparable to conventional, high-quality studio photography of actual footwear samples. Importantly, the digitization and realistic rendering do not require repeated, manual three-dimensional modeling for their creation.

Those of ordinary skill will appreciate that the above is accomplished in accordance with one embodiment of the invention through the use of footwear seamstresses or others ordinarily skilled in the deconstruction of the footwear, the use of three-dimensional computer artist operators and standard three-dimensional modeling software for the patterning of three-dimensional templates and modeling of the footwear outsole, and the use of trained operators for the wrapping using software programs implementing the functional system as described herein. The software system in accordance with one embodiment of the invention includes a web browser based display window enabling views of different stages of the Footwear Digitization System, each enabling access to a internet-based server resource, and allowing the various operators to complete their stage of the work from any web-enabled device.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a machine such as a special-purpose, proprietary server-based programmed computer or microprocessor by which instructions are executed, the instructions being stored for execution on a computer-readable medium and being executed by any suitable instruction processor. Where appropriate, serial processing by a single processor or desktop computer is contemplated. Where appropriate, parallel processing by one processor with multiple, parallel execution units, or by two or more concurrently operable, parallel processors each with one or more execution units (such as high-speed specialized processing units such as Graphic Processors (GPUs) or other hardware accelerators for fluid, real-time computation) is contemplated. Any one or more of such processors and architectures is contemplated as being within the spirit and scope of the invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A method for digitizing footwear and other cut-and-stitched goods, comprising:
    obtaining, a digital, three-dimensional (3D) reference model dimensionally representing a selected cut-and-stitched item;
    panelizing a physical sample of the selected cut-and-stitched item by separating the physical sample into one or more separate, flattened physical panels;
    capturing digitized images of each of the one or more flattened panels;
    producing, via a contour outline mechanism embodied as coded, machine-readable image-processing, instructions executing on data processing circuitry of a computing device, a two-dimensional (2D) contour map of each of the one or more digitized panel images;
    determining whether the 2D contour maps of the one or more separated panels match an available 3D template, wherein the matching between the 2D panel contour maps and the 3D template comprises determining that an overall quantity of panels in the 2D panel contour maps matches an overall quantity of panels in the 3D template, determining that a close match exists between shapes of the panels in the 2D panel contour maps and shapes of the panels in the 3D template; and determining that a close match exists between quantities and positions of original pre-panelized connection points of the panels of the 2D panel contour maps and quantities and positions of original pre-panelized connection points of the panels of the 3D template;
    converting contours of the 2D panel contour maps to vector-based curves by executing, via data processing circuitry of a computing device, coded, machine-readable instructions including a feature point extraction and curve-fitting algorithm;
    transforming sizes and shapes of panels of the matched 3D template to match the curves of the converted 2D panels;
    tessellating the panels of the 3D template; and
    wrapping the tessellated 3D panels onto the 3D reference model.

2. A method for digitizing footwear and other cut-and-stitched goods, comprising:
    obtaining, a digital, three-dimensional (3D) reference model dimensionally representing a selected cut-and-stitched item;
    panelizing a physical sample of the selected cut-and-stitched item by separating the physical sample into one or more separate, flattened physical panels;
    capturing digitized images of each of the one or more flattened panels;
    producing, via a contour outline mechanism embodied as coded, machine-readable image-processing, instructions executing on data processing circuitry of a computing device, a two-dimensional (2D) contour map of each of the one or more digitized panel images;
    determining whether the 2D contour maps of the one or more separated panels match an available 3D template;
    converting contours of the 2D panel contour maps to vector-based curves by executing, via data processing circuitry of a computing device, coded, machine-readable instructions including a feature point extraction and curve-fitting algorithm;
    transforming sizes and shapes of panels of the matched 3D template to match the curves of the converted 2D panels;
    tessellating the panels of the 3D template;
    wrapping the tessellated 3D panels onto the 3D reference model; and
    replicating in place each of the panels wrapped onto the 3D reference model, forming a second surface wrapped onto the 3D reference model.

3. The method of claim 2, wherein each panel of the second surface is connected with the panel of which it is a copy.

4. The method of claim 2, further comprising:
    displacing the second surface outwardly from the 3D reference model while maintaining 3D conformance therebetween.

5. The method of claim 4, wherein an amount of then outward displacement of the second surface varies at one portion of a panel of the second surface relative to either another portion of that same panel or a portion of another panel of the second surface.

6. The method of claim 4, wherein an amount of the outward displacement of the second surface corresponds to a thickness of a material of the physical sample of the selected cut-and-stitched item.

7. The method of claim 2, further composing:
displacing the second surface inwardly toward the 3D reference model while maintaining 3D conformance therebetween.

8. The method of claim 7, wherein an amount of the inward displacement of the second surface varies at one portion of a panel of the second surface relative to either another portion of that same panel or a portion of another panel of the second surface.

9. The method of claim 7, wherein an amount of the inward displacement of the second surface corresponds to a thickness of a material of the physical sample of the selected cut-and-stitched item.

10. A method for digitizing footwear and other cut-and-stitched goods, comprising:
obtaining, a digital, three-dimensional (3D) reference model dimensionally representing a selected cut-and-stitched item;
drawing, relative to the 3D reference model, a digitized 3D path of a lace corresponding to a lace path of the physical sample of the selected cut-and-stitched item;
panelizing a physical sample of the selected cut-and-stitched item by separating the physical sample into one or more separate, flattened physical panels;
capturing digitized images of each of the one or more flattened panels;
producing, via a contour outline mechanism embodied as coded, machine-readable image-processing, instructions executing on data processing circuitry of a computing device, a two-dimensional (2D) contour map of each of the one or more digitized panel images;
determining whether the 2D contour maps of the one or more separated panels match an available 3D template;
converting contours of the 2D panel contour maps to vector-based curves by executing, via data processing circuitry of a computing device, coded, machine-readable instructions including a feature point extraction and curve-fitting algorithm;
transforming sizes and shapes of panels of the matched 3D template to match the curves of the converted 2D panels;
tessellating the panels of the 3D template; and
wrapping the tessellated 3D panels onto the 3D reference model.

11. A method for digitizing footwear and other cut-and-stitched goods, comprising:
obtaining, a digital, three-dimensional (3D) reference model dimensionally representing a selected cut-and-stitched item, wherein the obtaining a digital, 3D reference model comprises either of scanning a physical sample of the selected cut-and-stitched item with a conventional 3D scanner or scanning a last corresponding to the selected cut-and-stitched item via a conventional 3D scanner, and further wherein the 3D reference model is modeled from a 3D scan of a last, further comprising manually modeling an unflattened portion of the physical sample;
panelizing a physical sample of the selected cut-and-stitched item by separating the physical sample into one or more separate, flattened physical panels;
capturing digitized images of each of the one or more flattened panels;
producing, via a contour outline mechanism embodied as coded, machine-readable image-processing, instructions executing on data processing circuitry of a computing device, a two-dimensional (2D) contour map of each of the one or more digitized panel images;
determining whether the 2D contour maps of the one or more separated panels match an available 3D template;
converting contours of the 2D panel contour maps to vector-based curves by executing, via data processing circuitry of a computing device, coded, machine-readable instructions including a feature point extraction and curve-fitting algorithm;
transforming sizes and shapes of panels of the matched 3D template to match the curves of the converted 2D panels;
tessellating the panels of the 3D template; and
wrapping the tessellated 3D panels onto the 3D reference model.

12. A method for digitizing footwear and other cut-and-stitched goods, comprising:
obtaining, a digital, three-dimensional (3D) reference model dimensionally representing a selected cut-and-stitched item;
panelizing a physical sample of the selected cut-and-stitched item by separating the physical sample into one or more separate, flattened physical panels;
capturing digitized images of each of the one or more flattened panels;
producing, via a contour outline mechanism embodied as coded, machine-readable image-processing, instructions executing on data processing circuitry of a computing device, a two-dimensional (2D) contour map of each of the one or more digitized panel images;
determining whether the 2D contour maps of the one or more separated panels match an available 3D template;
converting contours of the 2D panel contour maps to vector-based curves by executing, via data processing circuitry of a computing device, coded, machine-readable instructions including a feature point extraction and curve-fitting algorithm;
transforming sizes and shapes of panels of the matched 3D template to match the curves of the converted 2D panels;
tessellating the panels of the 3D template;
wrapping the tessellated 3D panels onto the 3D reference model; and
merging a digital model of an unflattened portion of the physical sample with the wrapped 3D panels in a configuration that is digitally faithful to a configuration of the unflattened portion relative to the physical panels in the physical sample prior to panelization of the cut-and-stitched item.

* * * * *